(12) United States Patent
Farre Guiu et al.

(10) Patent No.: US 11,989,922 B2
(45) Date of Patent: May 21, 2024

(54) AUTOMATED IMAGE ANALYSIS AND INDEXING

(71) Applicant: Disney Enterprises, Inc., Burbank, CA (US)

(72) Inventors: Miquel Angel Farre Guiu, Bern (CH); Monica Alfaro Vendrell, Barcelona (ES); Pablo Pernias, Sant Joan d'Alacant (ES); Francesc Josep Guitart Bravo, Lleida (ES); Marc Junyent Martin, Barcelona (ES); Albert Aparicio Isarn, Barcelona (ES); Anthony M. Accardo, Los Angeles, CA (US); Steven S. Shapiro, Pasacena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 148 days.

(21) Appl. No.: 17/675,978

(22) Filed: Feb. 18, 2022

(65) Prior Publication Data

US 2023/0267700 A1    Aug. 24, 2023

(51) Int. Cl.
  *G06V 10/25*  (2022.01)
  *G06N 20/20*  (2019.01)
  *G06V 10/46*  (2022.01)
  *G06V 20/70*  (2022.01)

(52) U.S. Cl.
  CPC ............ *G06V 10/25* (2022.01); *G06N 20/20* (2019.01); *G06V 10/462* (2022.01); *G06V 20/70* (2022.01)

(58) Field of Classification Search
  CPC ...... G06V 10/25; G06V 20/70; G06V 10/462; G06N 20/20
  See application file for complete search history.

(56) References Cited

U.S. PATENT DOCUMENTS

| 8,301,999 B2 | 10/2012 | Olson |
| 10,157,318 B2 | 12/2018 | Smolie et al. |
| 2006/0251338 A1* | 11/2006 | Gokturk .............. G06F 16/5854 707/E17.022 |

(Continued)

OTHER PUBLICATIONS

Runmin Cong, Jianjun Lei, Huazhu Fu, Ming-Ming Cheng, Weisi Lin and Qingming Huang "Review of Visual Saliency Detection with Comprehensive Information" IEEE Transactions on Circuits and Systems for Video Technology, 2018 pp. 1-19.

*Primary Examiner* — Pinalben Patel
(74) *Attorney, Agent, or Firm* — Farjami & Farjami LLP (57) ABSTRACT

A system includes a computing platform having processing hardware, and a memory storing software code. The processing hardware is configured to execute the software code to receive an image having a plurality of image regions, determine a boundary of each of the image regions to identify a plurality of bounded image regions, and identify, within each of the bounded image regions, one or more image sub-regions to identify a plurality of image sub-regions. The processing hardware is further configured to execute the software code to identify, within each of the bounded image regions, one or more first features, respectively, identify, within each of the image sub-regions, one or more second features, respectively, and provided an annotated image by annotating each of the bounded image regions using the respective first features and annotating each of the image sub-regions using the respective second features.

20 Claims, 4 Drawing Sheets

(56) References Cited

U.S. PATENT DOCUMENTS

| | | | |
|---|---|---|---|
| 2008/0077857 A1* | 3/2008 | Olson | G06F 16/9577 |
| | | | 715/854 |
| 2008/0301578 A1* | 12/2008 | Olson | G06F 16/9577 |
| | | | 715/802 |
| 2009/0290794 A1* | 11/2009 | Marchesotti | G06V 10/25 |
| | | | 382/173 |
| 2017/0365083 A1* | 12/2017 | Hartrell | G06F 18/214 |
| 2019/0311020 A1* | 10/2019 | Monroe | G06F 40/103 |

* cited by examiner

AUTOMATED IMAGE ANALYSIS AND INDEXING

BACKGROUND

Due to its nearly universal popularity as a content medium, ever more visual media content is being produced and made available to consumers. As a result, the efficiency with which visual images can be analyzed and rendered searchable has become increasingly important to the producers, owners, and distributors of that visual media content.

Annotation and indexing of visual media content for search is typically performed manually by human editors. However, such manual processing is a labor intensive and time consuming process. Moreover, in a typical visual media production environment there may be such a large number of images to be analyzed and indexed that manual processing of those images becomes impracticable. In response, various automated systems for performing image analysis have been developed. While offering efficiency advantages over traditional manual techniques, such automated systems are especially challenged by particular types of visual media content. For example, comics, graphic novels, and Japanese manga present stories about characters with features depicted from the perspectives of drawing artists with different styles that often change over time in different comic or manga issues, within the same comic or manga issue, in different graphic novels in a series, or within the same graphic novel. Moreover, a drawing artist might use different drawing qualities to emphasize different features across the arc of a single storyline. Those conditions make automating comic, graphic novel, and manga indexing for search particularly challenging, in so far as an automated system might only recognize a subset of the drawing styles. Consequently, there is a need in the art for automated systems and methods for analyzing and indexing images that substantially minimizes the number of such images that need to be manually processed.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Although annotation and indexing of visual media content has traditionally been performed manually by human annotators, also known as "taggers," the cost and time required by that human involvement has made automating that annotation process desirable. Nevertheless, particular types of visual media content continue to prove problematic for existing automated tagging systems. For example, and as noted above, comics, graphic novels, and Japanese manga present stories about characters with features depicted from the perspectives of drawing artists with different styles that often change over time in different comic or manga issues, within the same comic or manga issue, in different graphic novels in a series, or within the same graphic novel. Moreover, a drawing artist might use different drawing qualities to emphasize different features across the arc of a single storyline. Those conditions make automating comic, graphic novel, and manga indexing for search particularly challenging, in so far as an automated system might only recognize a subset of the drawing styles.

The present application discloses systems and methods for automating image analysis and indexing that address and overcome the special challenges posed by comics, graphic novels, manga, and other visual media content in which a page or other discrete subsection of the content may be a composite of distinctive image regions and sub-regions. For example, a page from a comic book, graphic novel, or manga may present a composite image including a plurality of distinctive image regions in the form of "panels," as known in the art. Moreover, each panel may include a plurality of sub-regions that are particularly salient due to the likelihood that the eye of a viewer of the image will be drawn to those sub-regions, because those sub-regions depict a main character or include foreground elements receiving emphasis within the panel, or any combination thereof. It is noted that although the present solution is described below in detail by reference to the exemplary use case of analyzing and annotating comics, graphic novels, and manga (hereinafter simply "comics") for search, the present novel and inventive principles may more generally be applied to any visual media content, such as rough sketches, photos, illustrated books, and video, for example to increase the consistency and accuracy with which annotations are applied to such content by automated systems and methods.

It is noted that, as defined in the present application, the expression "local feature" or "local features" refer specifically to one or more individual objects or actions depicted within a comics panel or panel sub-region, while the expression "global feature" or "global features" refers to a visual impression produced by the comics panel or panel sub-region as a whole. By way of example, a comics panel may include local (individual) features such as one or more of "grass," "trees," and "benches." Where grass and trees, but not benches, are present, a global feature of the comics panel (hereinafter "bounded image region global feature," or "panel global feature") may be "forest," thereby identifying an environment in which the local features are situated. Alternatively, where grass and benches, or grass, trees, and benches are present, a panel global feature of the comics panel may be "park," thereby identifying a different environment in which the local features are situated. With respect to panel sub-regions, by contrast, a single object, character, or action may represent the visual impact of the panel sub-region as a whole. For example, a single main character or foreground element depicted by a panel sub-region may serve as a global feature of that panel sub-region (hereinafter "image sub-region global feature").

With respect to the feature "panels," it is further noted that a comics panel may be considered to be analogous to a video frame that captures a portion of a shot or scene of video at a particular instant in time. In the context of video, a "shot" refers to a sequence of video frames that is captured from a unique camera perspective without cuts and other cinematic transitions. Moreover, a "scene" refers to a sequence of shots that correspond to one another thematically, either by sharing a common background or location, or by being directed to the same event, i.e., series of actions. As defined in the present application, a relationship among sequential comics panels analogous to a shot of video may refer to one in which the perspective from which the related panels are drawn does not change, although the local features portrayed within the panels may change. Alternatively, or in addition, as further defined in the present application, a relationship among sequential comics panels analogous to a scene of video may refer to one in which global features remain the same despite a change or changes in the perspective from which the related panels are drawn.

Regarding image sub-regions, referred to in the previous paragraph as "panel sub-regions," each image sub-region is a portion of a panel, analogous to a portion of a video frame, that has been determined as likely to attract the eye of a viewer of the image, or that includes a main character or foreground element. It is noted that, in some use cases, some of the panel sub-regions within a panel may intersect one another. For example, an image sub-region determined to be salient due to high color contrast within the sub-region may partially overlap another image sub-region surrounding a main character, the face of a main character, or a foreground element.

It is also noted that, as defined in the present application, the terms "automation," "automated," and "automating" refer to systems and processes that do not require the participation of a human user, such as a human editor or system administrator. For example, although in some implementations a human system administrator may review the performance of the systems and methods disclosed herein, and, in some cases may modify the annotations applied to an image by the present systems and methods, that human involvement is optional. Thus, in some implementations, the processes described in the present application may be performed under the control of hardware processing components of the disclosed systems.

Moreover, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes a plurality of hidden layers between input and output layers, which may allow for learning based on features not explicitly defined in raw data. In various implementations, NNs may be trained as classifiers and may be utilized to perform image processing or natural-language processing.

Figure 1:
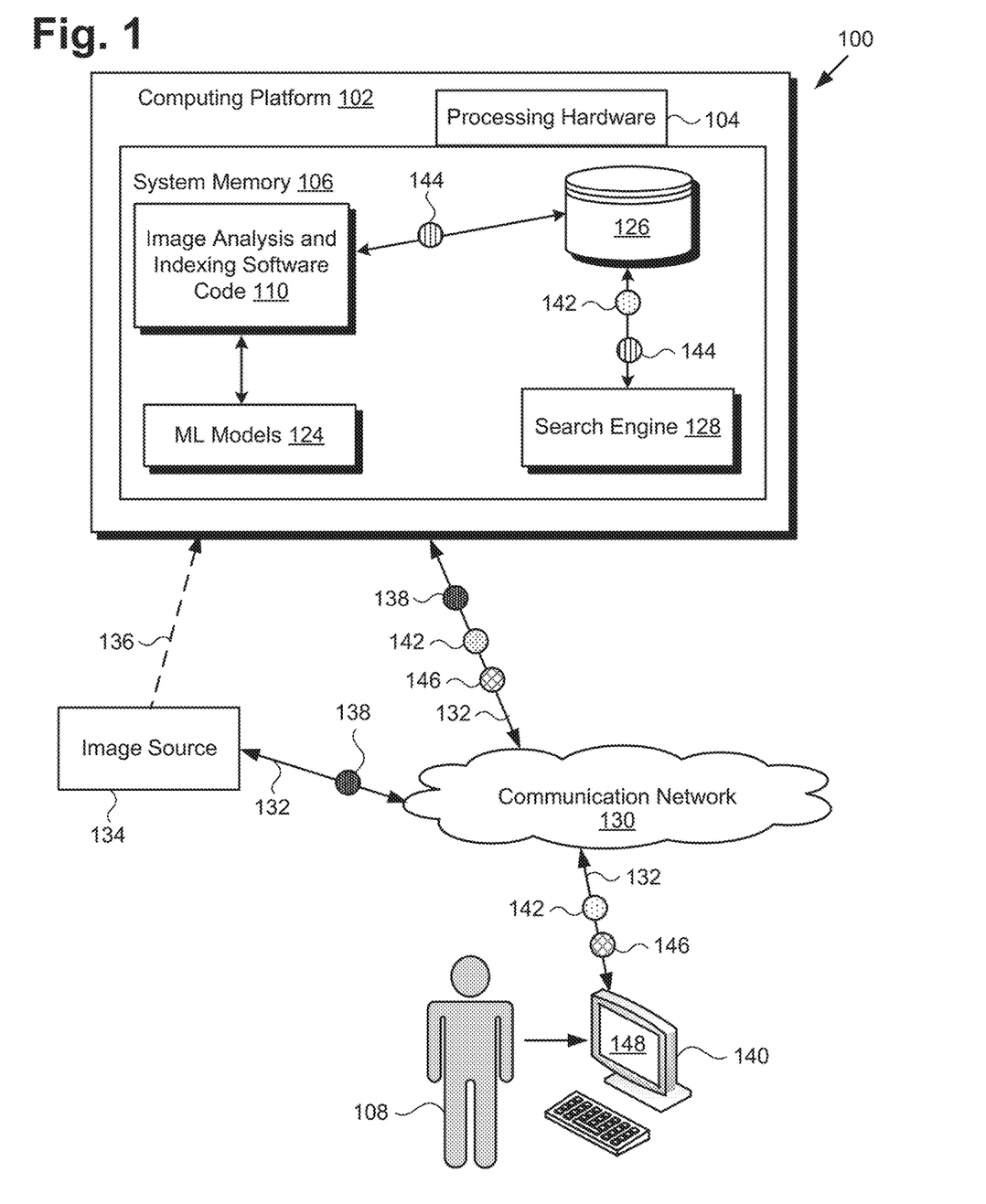
FIG. 1 shows a diagram of an exemplary system for automating image analysis and indexing, according to one implementation.

FIG. 1 shows a diagram of exemplary system 100 for automating image analysis and indexing, according to one implementation. System 100 includes computing platform 102 having processing hardware 104, and system memory 106 implemented as a computer-readable non-transitory storage medium. As shown in FIG. 1, according to some implementations, system memory 106 stores image analysis and indexing software code 110, trained machine learning models 124 (hereinafter "trained ML models 124"), and in some implementations, stores one or both of image search database 126 and search engine 128.

As further shown in FIG. 1, system 100 may be implemented in a use environment including image source 134 providing visual media image 138 (hereinafter "image 138"), communication network 130, and user 108 utilizing user system 140 including display 148. In addition, FIG. 1 shows network communication links 132 communicatively coupling image source 134 and user system 140 with system 100 via communication network 130. Also shown in FIG. 1 are annotated image 144 corresponding to image 138, search data 142 received from user system 140, and search results 146 generated by search engine 128.

It is noted that although system 100 may receive image 138 from image source 134 via communication network 130 and network communication links 132, in some implementations, image source 134 may take the form of a image source integrated with computing platform 102, or may be in direct communication with system 100, as shown by dashed communication link 136. It is further noted that, in some implementations, system 100 may omit one or both of image search database 126 and search engine 128. Thus, in some implementations, system memory 106 may store image analysis and indexing software code 110 and trained ML models 124, but not image search database 126 or search engine 128.

With respect to the representation of system 100 shown in FIG. 1, it is noted that although image analysis and indexing software code 110, ML models 124, image search database 126, and search engine 128 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts image analysis and indexing software code 110, ML models 124, image search database 126, and search engine 128 as being mutually co-located in system memory 106, that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that image analysis and indexing software code 110, ML models 124, image search database 126, and search engine 128 may be stored remotely from one another within the distributed memory resources of system 100. It is also noted that, in some implementations, one or more of ML models 124, and search engine 128 when included in system 100, may take the form of software modules included in image analysis and indexing software code 110.

Processing hardware 104 may include a plurality of hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as image analysis and indexing software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as ML modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

Although user system 140 is shown as a desktop computer in FIG. 1, that representation is provided merely as an example as well. More generally, user system 140 may be any suitable mobile or stationary computing device or system that implements data processing capabilities sufficient to provide a user interface, support connections to communication network 130, and implement the functionality ascribed to user system 140 herein. For example, in other implementations, user system 140 and may take the form of a laptop computer, tablet computer, or smartphone.

With respect to display 148 of user system 140, display 148 may be physically integrated with user system 140, or may be communicatively coupled to but physically separate from respective user system 140. For example, where user system 140 is implemented as a smartphone, laptop computer, or tablet computer, display 148 will typically be integrated with user system 140. By contrast, where user system 140 is implemented as a desktop computer, display 148 may take the form of a monitor separate from user system 140 in the form of a computer tower. Furthermore, display 148 of user system 140 may be implemented as a liquid crystal display (LCD), a light-emitting diode (LED) display, an organic light-emitting diode (OLED) display, a quantum dot (QD) display, or any other suitable display screen that performs a physical transformation of signals to light.

Figure 2:
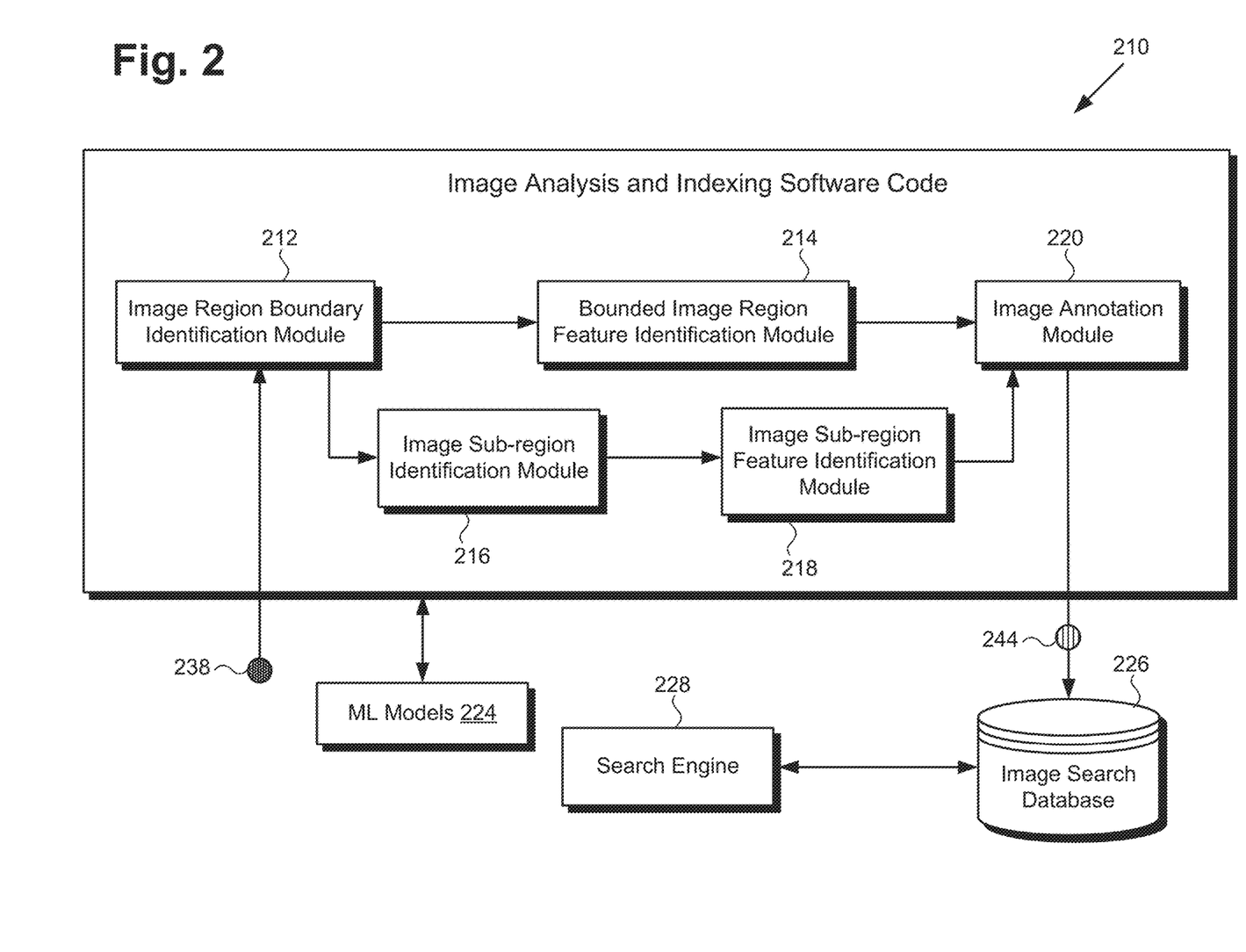
FIG. 2 shows an exemplary diagram of image analysis and indexing software code suitable for use by the system shown in FIG. 1, according to one implementation.

FIG. 2 shows an exemplary diagram of image analysis and indexing software code 210 suitable for use by system 100, in FIG. 1, according to one implementation. According to the exemplary implementation shown in FIG. 2, image analysis and indexing software code 210 includes Image Region Boundary Identification Module 212, Bounded Image Region Feature Identification Module 218, Image Sub-region Identification Module 216, Image Sub-region Feature Identification Module 218, and Image Annotation Module 220. In addition, FIG. 2 includes trained machine learning models 224 (hereinafter "trained ML models 224"), image search database 226, and search engine 228. Also shown in FIG. 2 are image 238 processed by image analysis and indexing software code 210, and annotated image 244 corresponding to image 238 and provided as an output by image analysis and indexing software code 210.

Trained ML models 224, image search database 226, search engine 228, image 238, and annotated image 244 correspond respectively in general to trained ML models 124, image search database 126, search engine 128, image 138, and annotated image 144, in FIG. 1. Consequently, trained ML models 224, image search database 226, search engine 228, image 238, and annotated image 144 may share any of the characteristics attributed to respective trained ML models 124, image search database 126, search engine 128, image 138, and annotated image 144 by the present disclosure, and vice versa.

Moreover, image analysis and indexing software code 210, in FIG. 2, corresponds in general to image analysis and indexing software code 110, in FIG. 1, and those corresponding features may share any of the characteristics attributed to either corresponding feature by the present disclosure. Thus, although not shown in FIG. 1, image analysis and indexing software code 110 may include features corresponding respectively to image Region Boundary Identification Module 212, Bounded Image Region Feature Identification Module 218, Image Sub-region Identification Module 216, Image Sub-region Feature Identification Module 218, and Image Annotation Module 220.

It is noted that in some implementations, Image Region Boundary Identification Module 212 of image analysis and indexing software code 110/210 may be configured to utilize a trained ML model included among trained ML models 124/224 (hereinafter a "first trained ML model") to identify bounded image regions within image 138/238. In implementations in which the first trained ML model is trained to identify individual comics panels, for example, the first trained ML model may be trained on a training dataset including comics pages annotated by a human tagger. Edge detection may be performed on comics pages to extract panels having solid backgrounds and square boundaries from those pages, and that edge detection data may also be included in the training dataset. In addition, synthetic pages may be generated using the panels identified using the aforementioned techniques, i.e., human tagging and edge detection. Those synthetic pages may be generated using different compositions of comics panels, changing the backgrounds of panels, and modifying the geometry of the panels. Those synthetic pages of panels may also be included in the training set data used to train the first trained ML model.

Bounded Image Region Feature Identification Module 214 may utilize a set of tools to extract semantic information from comics panels at different levels of granularity, e.g., the local features and panel global features defined above. For example, Bounded Image Region Feature Identification Module 214 may utilize one or more other trained ML models included among trained ML models 124/224, (hereinafter "second trained ML model(s)"), which may include a computer vision model for example, to detect local features in the form of objects, such as characters and props, for instance, within panels. In addition, or alternatively, the second trained ML model(s) may be used to detect panel global features in the form of locations or backgrounds, for example, depicted by each panel as a whole. In one implementation, for example, the second trained ML model(s) may include a trained neural network for Connecting Text and Images, or trained "CLIP" model, which is able to project visual features and text prompts in the same latent space, thereby advantageously providing a robust and general understanding of the global context of a panel. The output of the second trained ML model(s) may be a pair or pairs of predicted labels and probability values that can subsequently be used jointly by search engine 128/228 to rank the search results Image Sub-region Identification Module 216 of image analysis and indexing software code 110/210 may be configured to perform one or both of saliency detection or foreground element detection to identify relevant sub-regions within the bounded image regions of image 138/238. For example, in some implementations, Image Sub-region Identification Module 216 of image analysis and indexing software code 110/210 may utilize one or both of a trained saliency detection ML model or a trained foreground element detection model included among trained ML models 124/224 to identify such relevant sub-regions within the bounded image regions of image 138/238.

It is noted that once bounded image regions or panels have been identified within image 138/238 using Image Region Boundary Identification Module 212 of image analysis and indexing software code 110/210, the amount of information to be indexed has been reduced to what is contained in each panel, but in many cases the complexity of a panel is still too great and it may be advantageous or desirable to further partition the panel into image sub-regions of interest. In order to detect relevant portions of a panel where it is predicted that useful and interesting information lays, a trained saliency detection ML model may be utilized to find the elements of a panel that, are predicted to attract the eye of a viewer of the panel more than others. Those sub-regions will typically be sub-regions surrounding faces, high-contrast elements, or objects that are especially relevant to the storyline depicted by the image including the panels and image sub-regions. By way of example, for comics having an auto racing theme, any car may be predictable to be an object that is relevant to the storyline of the comics. Regarding the concept of the salience or saliency of features within an image, a review of image saliency detection and determination is described in the publication titled "Review of Visual Saliency Detection with Comprehensive Information," by Cong et al. (see Runmin Cong, Jianjun Lei, Huazhu Fu, Ming-Ming Cheng, Weisi Lin, and Qingming Huang, IEEE Transactions on Circuits and Systems for Video Technology, Vol. 29, Issue. 10, October 2019), which is hereby incorporated fully by reference into the present application.

In addition to saliency detection, synthetic depth maps may be generated using a trained foreground element detection ML model. Such synthetic depth maps may be used to distinguish between foreground and background elements, thereby enabling identification of image sub-regions surrounding foreground elements. Use of both techniques enables the isolation of image sub-regions and image sub-region global features.

Image Sub-region Feature Identification Module 218 may utilize yet other one or more trained ML models included among trained ML models 124/224 (hereinafter "third trained ML model(s)"), which may include a computer vision model or trained CLIP model, for example. In some implementations, Image Sub-region Feature Identification Module 218 may both detect and identify image sub-region global features considered to be relevant. Alternatively or in addition, Image Sub-region Feature Identification Module 218 may identify the image sub-region global features isolated by Image Sub-region identification Module 216, as described above.

Image Annotation Module 220 may be configured to annotate image 138/238 based using the outputs of Bounded Image Region Feature Identification Module 214 and Image Sub-region Feature Identification Module 218. That is to say, Image Annotation Module 220 may annotate each of the bounded image regions identified by Image Region Boundary Identification Module 212 using one or both of the local features and bounded image region global features identified by Bounded Image Region Feature Identification Module 214, and may annotate each of the image sub-regions identified by Image Sub-region identification Module 216 using the image sub-region global features identified by Image Sub-region Feature Identification Module 218, to provide annotated image 144/244 corresponding to image 138/238.

Figure 3:
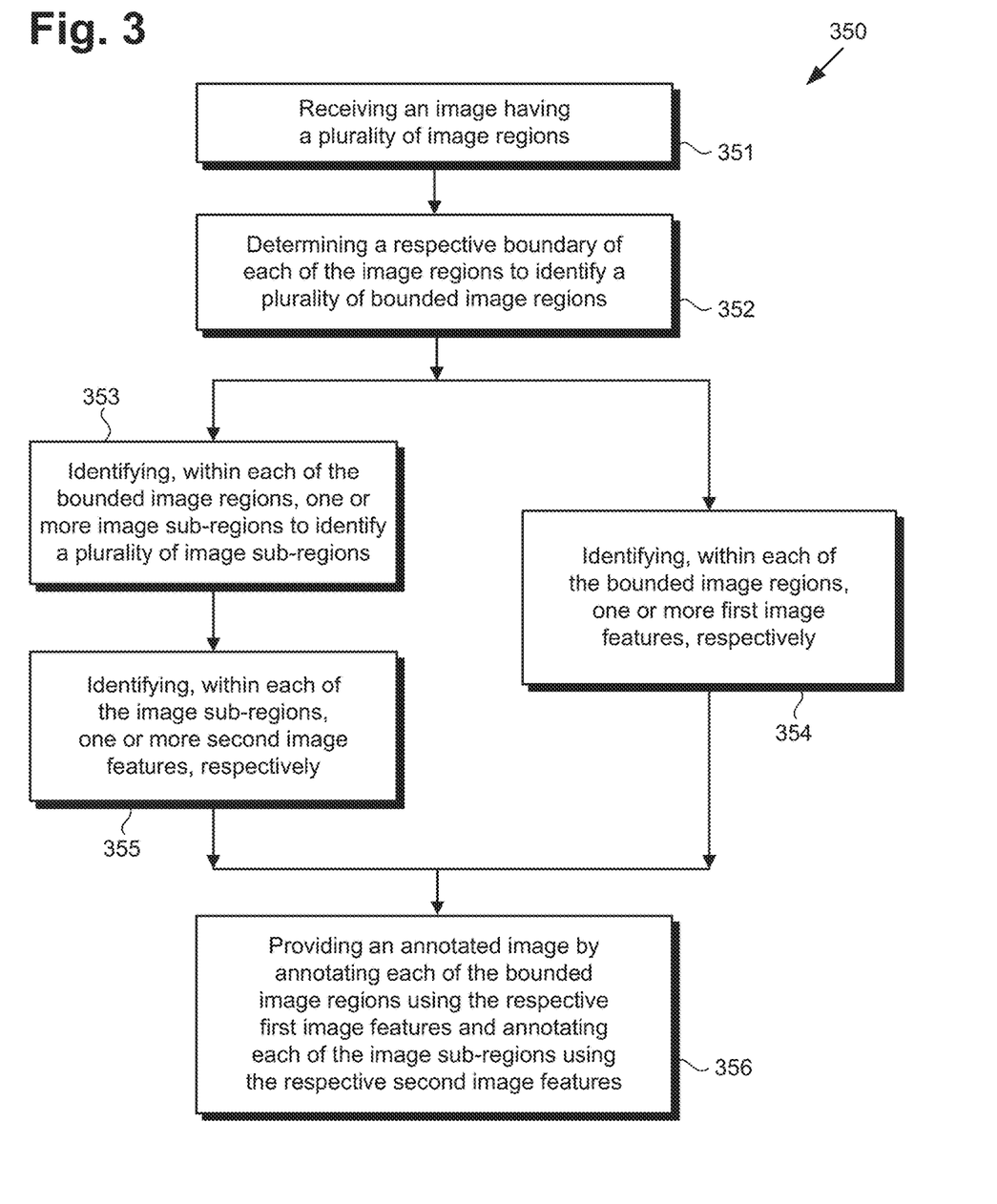
FIG. 3 shows a flowchart outlining an exemplary method for automating image analysis and indexing, according to one implementation.

The functionality of system 100 will be further described by reference to FIG. 3. FIG. 3 shows flowchart 350 presenting an exemplary method for automating image analysis and indexing, according to one implementation. With respect to the method outlined in FIG. 3, it is noted that certain details and features have been left out of flowchart 350 in order not to obscure the discussion of the inventive features in the present application. Moreover, although as noted above the present novel and inventive principles may be applied to any visual media content, such as rough sketches, photos, illustrated books, and video, for example to increase the consistency and accuracy with which annotations are applied to such content by automated annotation systems and methods, the method outlined by flowchart 350 will be described by reference to the exemplary use case of analyzing and indexing comics.

Referring now to FIG. 3 in combination with FIGS. 1 and 2, flowchart 350 begins with receiving image 138/238 having a plurality of image regions (action 351). For example, image 138/238 in the form of comics may having one or more images in the form of pages, each including a plurality of image regions in the form of panels. Image 138/238 may be received in action 351 by image analysis and indexing software code 110/210, executed by processing hardware 104 of computing platform 102.

Flowchart 350 further includes determining a respective boundary of each of the image regions of image 138/238 to identify a plurality of bounded image regions (action 352). Identification of the plurality of bounded image regions of image 138/238 may be performed in action 352 by image analysis and indexing software code 110/210, executed by processing hardware 104 of computing platform 102, and using Image Region Boundary Identification Module 212.

As noted above by reference to FIG. 2, in some implementations, Image Region Boundary Identification Module 212 of image analysis and indexing software code 110/210 may be configured to utilize a first trained ML model included among trained ML models 124/224 to identify bounded image regions within image 138/238. In implementations in which the first trained ML model is trained to identify individual comics panels, for example, that first trained ML model may be trained on a training dataset including comics pages annotated by a human tagger. Edge detection may be performed on comics pages to extract panels having solid backgrounds and square boundaries from those pages, and that edge detection data may also be included in the training dataset. In addition, synthetic pages may be generated using the panels identified using the aforementioned techniques, i.e., human tagging and edge detection. Those synthetic pages may be generated using different compositions of comics panels, changing the backgrounds of panels, and modifying the geometry of the panels. Those synthetic pages of panels may also be included in the training set data used to train the first trained ML model.

Flowchart 350 further includes identifying, within each of the bounded image regions identified in action 352, one or more image sub-regions to identify a plurality of image sub-regions within image 138/238 (action 353). That is to say, while each of the bounded image regions identified in action 352 may include as few as one image sub-region, image 138/238 as a whole includes the plurality of image sub-regions identified in action 353. The identification of the plurality of image sub-regions in action 353 may be performed by image analysis and indexing software code 110/210, executed by processing hardware 104 of computing platform 102, and using Image Sub-region Identification Module 216.

As described above by reference to FIG. 2, Image Sub-region Identification Module 216 of image analysis and indexing software code 110/210 may be configured to perform one or both of saliency detection or foreground element detection to identify relevant sub-regions within the bounded image regions of image 138/238. For example, in some implementations, Image Sub-region Identification Module 216 of image analysis and indexing software code 110/210 may utilize one or both of a trained saliency detection ML model or a trained foreground element detection model included among trained ML models 124/224 to identify such relevant sub-regions within the bounded image regions of image 138/238.

As further noted above, inn order to detect relevant portions of a panel where it is predicted that useful and interesting information lays, a trained saliency detection ML model may be utilized to find the elements of a panel that are predicted to attract the eye of a viewer of the panel more than others. Those sub-regions will typically be sub-regions surrounding faces, high-contrast elements, or objects that are especially relevant to the storyline depicted by the image including the panels and image sub-regions. In addition to saliency detection, synthetic depth maps may be generated using a trained foreground element detection ML model. Such synthetic depth maps may be used to distinguish between foreground and background elements, thereby enabling identification of image sub-regions surrounding foreground elements. Use of both techniques advantageously enables the isolation of image sub-regions.

Flowchart 350 further includes identifying, within each of the bounded image regions identified in action 352, one or more features, respectively (action 354). It is noted that the features identified in action 354 will hereinafter be referred to as "first features." Action 354 may be performed by image analysis and indexing software code 110/210, executed by processing hardware 104 of computing platform 102, and using Bounded Image Region Feature Identification Module 214.

As discussed above by reference to FIG. 2, Bounded Image Region Feature Identification Module 214 may utilize a set of tools to extract semantic information from comics panels at different levels of granularity, e.g., the local features and panel global features defined above. For example, Bounded Image Region Feature Identification Module 214 may utilize second trained ML model(s), which may include a computer vision model for instance, to detect local features in the form of objects, such as characters and props, for example, within panels. In addition, or alternatively, the second trained ML model(s) may be used to detect panel global features in the form of locations or backgrounds, for example, depicted by each panel as a whole. In one implementation, for example, and as also discussed above, the second trained ML model(s) may include a trained CLIP model, which is able to project visual features and text prompts in the same latent space, thereby advantageously providing a robust and general understanding of the global context of a panel. The output of the second trained ML model(s) may be a pair or pairs of predicted labels and probability values that can subsequently be used jointly by search engine 128/228 to rank the search results.

Flowchart 350 further includes identifying, within each of the Image sub-regions identified in action 353, one or more features, respectively (action 355). It is noted that the features identified in action 355 will hereinafter be referred to as "second features." Action 355 may be performed by image analysis and indexing software code 110/210, executed by processing hardware 104 of computing platform 102, and using Image Sub-region Feature Identification Module 218.

As discussed above, Image Sub-region Feature Identification Module 218 may utilize third trained ML model(s), which may include a computer vision model or trained CLIP model, for example. In some implementations, Image Sub-region Feature Identification Module 218 may both detect and identify image sub-region global features considered to be relevant. Alternatively or in addition, Image Sub-region Feature Identification Module 218 may identify the image sub-region global features isolated by Image Sub-region identification Module 216, as described above.

Referring to flowchart 350 in combination with FIGS. 1 and 2, flowchart 350 further includes providing annotated image 144/244 by annotating each of the bounded image regions identified in action 352 using the respective first features identified in action 354 and annotating each of the image sub-regions identified in action 353 using the respective second features identified in action 355 (action 356). Image Annotation Module 220 may be configured to annotate image 138/238 using the outputs of Bounded Image Region Feature Identification Module 214 and Image Sub-region Feature Identification Module 218. That is to say, Image Annotation Module 220 may annotate each of the bounded image regions identified by image Region Boundary Identification Module 212 using one or both of the local features and bounded image region global features identified by Bounded Image Region Feature Identification Module 214, and may annotate each of the image sub-regions identified by Image Sub-region Identification Module 216 using the image sub-region global features identified by Image Sub-region Feature identification Module 218, to provide annotated image 144/244 corresponding to image 138/238.

It is noted that, in various implementations, annotated image 144/244 may take the form of annotated comics, which may include annotated manga or annotated graphic novels, for example. Moreover, and as depicted in FIGS. 2 and 3, in some implementations, one or both of actions 353 and 355 may be performed in parallel, i.e., substantially concurrently, with action 354.

Figure 4:
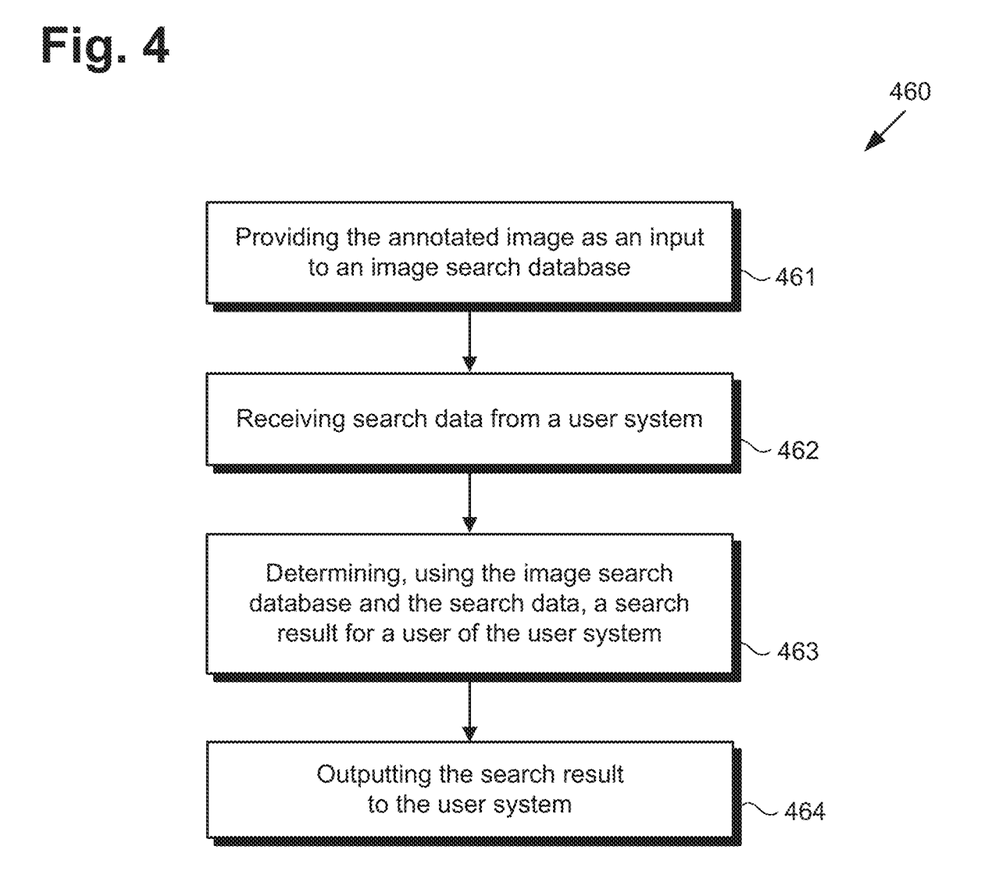
FIG. 4 shows a flowchart describing exemplary actions for extending the method outlined ire FIG. 3, according to one implementation.

Referring now to FIG. 4, FIG. 4 shows flowchart 460 describing exemplary actions for extending the method outlined in FIG. 3, according to one implementation. With respect to the actions described in FIG. 4, it is noted that certain details and features have been left out of flowchart 460 in order not to obscure the discussion of the inventive features in the present application. Referring to FIGS. 1 and 2, as noted above, in some implementations, system 100 includes one or both of image search database 126/226 and search engine 128/228. In various implementations, search engine 128/228 may be configured to identify images having features sought by user 108, based on search data 142 received from user 108.

In those implementations, processing hardware 104 of computing platform 102 may execute image analysis and indexing software code 110/210 to provide annotated image 144/244 as an input to image search database 126/226 action 461). Flowchart 460 further includes receiving search data 142 from user system 140 (action 462). Search data 142 may include data identify local image features, global image features, or local and global image features sought by user 108. In some use cases, search data 142 may identify visual media content other than comics, such as visual media content in the form of one or more of a streamable movie, streamable TV content, a live stream of a sports event, a live stream of news, or a video game, to name a few examples, or physical media, such as a Digital Video Disc (DVD) for instance, on which visual media content is stored. However, in other implementations, the types of visual media content sought by user 108 may be preset in the preferences of user 108. As shown in FIG. 1, search data 142 may be received by system 100 from user system 140 utilized by user 108, via communication network 130 and network communication links 132. Action 462 may be performed by search engine 128/228, executed by processing hardware 104 of computing platform 102.

Flowchart 460 further includes determining, using image search database 126/226 and search data 142, search result 146 for user 108 of user system 140 (action 463). Determination of search result 146 in action 463 may be performed by search engine 128/228, executed by processing hardware 104 of computing platform 102, and using image search database 126/226 and search data 142.

Referring to the exemplary use case in which image 138/238 takes the form of comics, it is noted that image search database 126/226 includes entries in the form of annotated image 144/244 identifying bounded image regions (panels), and image sub-regions within those panels. As a result, when performing a search for an image, search engine 128/228 may be configured to query image search database 126/226 at the panel level or at the image sub-region level.

When searching at the panel level the search may be performed on the panels and the identified sub-regions within the panels. The search results may then be aggregated at the panel level and the panel result score can be compared to its sub-region result scores. That is to say, when searching at the panel level, determining the search result for user 108 in action 463 may include searching the bounded image regions or panels that include the searched sub-regions. When searching at the image sub-region level, the panels as a whole may be excluded from the search. Thus, when searching at the image sub-region level, determining the search result for user 108 in action 463 includes searching the sub-regions of annotated images stored on image search database 126/226.

It is noted that when searching is performed based on image similarity, instead of being text based, search data 142 provided by user 108 may specify that particular regions of an image be searched for similar features. For example, if user 108 is searching for an image of a sword but is in possession of an exemplar image showing a hero character holding a sword, search data 142 may specify that only the sword region of the image be used as search criterion. Search engine, 128/228, when executed by processing hardware 104, will try to find images with regions closer to that specific criterion; that is to say, images showing swords. For example, user 108 might specify only a region of image 138/238, i.e., the region including the sword, to be used in the search, instead of the entirety of image 138/238. If the search data 142 specifies that only the sword region is to be used as the search criterion, a search of the contents of image search database 126/226 can be expected to return images of swords or sub-regions that represent a sword, thus finding swords even if the swore represents a small part of the overall image. If search data 142 specifies a character handling a sword, either the character, the sword, or both may be used to search the contents of image search database 126/226. In that use case, the search may return images containing the sword or the character.

Flowchart 460 further includes outputting search result 146 to user system 140 (action 464). It is noted that in implementations in which search data 142 received in action 462 includes a search for comics, search result 146 for user 108 may identify annotated comics, which may include annotated manga or annotated graphic novels, exclusively. However, where search data 142 received in action 462 does not limit, the search to comics, search result 146 for user 108 may identify visual media content in the form of one or more of a streamable movie, streamable TV content, a live stream of a sports event, a live stream of news, or a video game, to name a few examples, or physical media, such as a DVD for instance, on which visual media content is stored. It is noted that in use cases in which the visual media content sought by user 108 is encoded on a physical medium such as a DVD and is consequently not directly searchable, identification of such content in response to search data 142 may be based on descriptive metadata for that content stored in image search database 126/226. As shown in FIG. 1, search result 146 may be output to user system 140 utilized by user 108, by system 100, via communication network 130 and network communication links 132. Action 464 may be performed by search engine 128, executed by processing hardware 104 of computing platform 102.

With respect to the actions described by flowcharts 350 and 460, it is noted that although the methods outlined by FIGS. 3 and 4 have been described by reference to the exemplary use case of analyzing and annotating comics for search, the present novel and inventive principles may more generally be applied to any visual media content, such as rough sketches, photos, illustrated books, and video, for example to increase the consistency and accuracy with which annotations are applied to such content by automated systems and methods.

With respect to visual media content in the form of a single sketch or photo, it is noted that such an image may be considered to be a collage of distinguishable objects each constituting an image region. Moreover, when an object within an image includes a plurality of features, each feature may be seen to occupy a sub-region of the image. In some applications of the present novel and inventive concepts to visual media content other than comics, actions 352 and 354 may be omitted. That is to say, the method outlined by FIG. 3 may include actions 351, 353, 355 in sequence, followed by annotation of each of the image sub-regions in action 356, using only the image features identified in action 355.

Thus, in some use cases, an image received in action 351 could be fed directly to Image Sub-region Identification Module 216 for processing in action 353 and then on to Image Sub-region Feature Identification Module 218 in next action 355 to allow for an improved search of any kind of image.

It is further noted that actions 351, 353, 355, and 356, or actions 351, 353, 355, 356, and 461, or actions 351, 353, 355, 356, and actions 461, 462, 463, and 464 (hereinafter "actions 461-464,"), or actions 351, 352, 353, 354, 355, and 356 (hereinafter "actions 351-356"), or actions 351-356 and 461, or actions 351-356 and 461-464, may be performed as automated processes from which human involvement may be omitted.

Thus, the present application discloses systems and methods for automating image analysis and indexing. The solution disclosed in the present application advances the state-of-the-art by increasing the speed, consistency, and accuracy with which annotations can be applied to visual media content in the form of comics, rough sketches, photos, illustrated books, and video. Moreover, when used in conjunction with a search engine, the present solution can be used to increase the relevance of images surfaced for a user relative to the search criteria specified by the user, thereby advantageously enhancing the user's productivity.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform having a processing hardware and a system memory storing a software code;
   the processing hardware configured to execute the software code to:
   receive an image having a plurality of panels, each of the plurality of panels depicting a plurality of features;
   determine a respective boundary of each of the plurality of panels to identify a plurality of bounded image regions;
   identify, within each of the plurality of bounded image regions, respective one or more image sub-regions to identify a plurality of image sub-regions;
   identify, within each of the plurality of bounded image regions, one or more first features of the plurality of features, respectively;
   identify, within each of the plurality of image sub-regions, one or more second features of the plurality of features, respectively; and
   provide an annotated image by annotating each of the plurality of bounded image regions using the respective first features and annotating each of the plurality of image sub-regions using the respective second features.

2. The system of claim 1, wherein the processing hardware is further configured to execute the software code to:
   determine the respective boundary of each of the plurality of panels using a first trained machine learning (ML) model of a plurality of trained ML models;
   identify, within each of the plurality of bounded image regions, the one or more first features using one or more second trained ML model(s) of the plurality of trained ML models; and
   identify, within each of the plurality of image sub-regions, the one or more second features using one or more third trained ML model(s) of the plurality of trained ML models.

3. The system of claim 1, wherein the processing hardware is further configured to execute the software code to:
   identify the plurality of image sub-regions using at least one of a trained saliency detection ML model or a trained foreground element detection element ML model.

4. The system of claim 1, wherein at least some of the plurality of image sub-regions intersect one another.

5. The system of claim 1, wherein the annotated image comprises at least one of an annotated comic, an annotated graphic novel, or an annotated manga.

6. The system of claim 1, further comprising an image search database, wherein the processing hardware is further configured to execute the software code to provide the annotated image as an input to the image search database.

7. The system of claim 6, further comprising a search engine, wherein the processing hardware is configured to execute the search engine to:
   receive search data from a user system;
   determine, using the image search database and the search data, a search result; and
   output the search result to the user system.

8. The system of claim 7, wherein the search result identifies at least one of an annotated comic, an annotated graphic novel, or an annotated manga.

9. The system of claim 7, wherein determining the search result comprises searching sub-regions of annotated images stored in the image search database.

10. The system of claim 9, wherein determining the search result further comprises searching bounded image regions including the searched sub-regions.

11. A method for use by a system including a computing platform having a processing hardware, and a system memory storing a software code, the method comprising:
    receiving, by the software code executed by the processing hardware, an image having a plurality of panels, each of the plurality of panels depicting a plurality of features;
    determining, by the software code executed by the processing hardware, a respective boundary of each of the plurality of panels to identify a plurality of bounded image regions;
    identifying, by the software code executed by the processing hardware within each of the plurality of bounded image regions, respective one or more image sub-regions to identify a plurality of image sub-regions;
    identifying, by the software code executed by the processing hardware within each of the plurality of bounded image regions, one or more first features of the plurality of features, respectively;
    identifying, by the software code executed by the processing hardware within each of the plurality of image sub-regions, one or more second features of the plurality of features, respectively; and
    providing an annotated image, by the software code executed by the processing hardware, by annotating each of the plurality of bounded image regions using the respective first features and annotating each of the plurality of image sub-regions using the respective second features.

12. The method of claim 11, further comprising:
determining by the software code executed by the processing hardware, the respective boundary of each of the plurality of panels using a first trained machine learning (ML) model of a plurality of trained ML models;
identifying, by the software code executed by the processing hardware within each of the plurality of bounded image regions, the one or more first features using one or more second trained ML model(s) of the plurality of trained ML models; and
identifying, by the software code executed by the processing hardware within each of the plurality of image sub-regions, the one or more second features using one or more third trained ML model(s) of the plurality of trained ML models.

13. The method of claim 11, further comprising:
identifying the plurality of image sub-regions, by the software code executed by the processing hardware, using at least one of a trained saliency detection ML model or a trained foreground element detection element ML model.

14. The method of claim 11, wherein at least some of the plurality of image sub-regions intersect one another.

15. The method of claim 11, wherein the annotated image comprises at least one of an annotated comic, an annotated graphic novel, or an annotated manga.

16. The method of claim 11, wherein the system further comprises an image search database, the method further comprising:
providing, by the software code executed by the processing hardware, the annotated image as an input to the image search database.

17. The method of claim 16, wherein the system further comprises a search engine, the method further comprising:
receiving, by the search engine executed by the processing hardware, search data from a user system;
determining, by the search engine executed by the processing hardware, using the image search database and the search data, a search result; and
outputting, by the search engine executed by the processing hardware, the search result to the user system.

18. The method of claim 17, wherein determining the search result comprises searching, by the search engine executed by the processing hardware, sub-regions of annotated images stored in the image search database.

19. The method of claim 18, wherein determining the search result further comprises searching bounded image regions including the searched sub-regions.

20. A system comprising:
a processing hardware;
a system memory storing a software code; and
a plurality of trained machine learning (ML) models;
the processing hardware configured to execute the software code to:
receive an image having a plurality of image regions;
determine, using a first trained ML model of the plurality of trained ML models, a respective boundary of each of the plurality of image regions to identify a plurality of bounded image regions;
identify, within each of the plurality of bounded image regions, respective one or more image sub-regions to identify a plurality of image sub-regions;
identify within each of the plurality of bounded image regions, using one or more second trained ML model(s) of the plurality of trained ML models, one or more first features, respectively;
identify within each of the plurality of image sub-regions, using one or more third trained ML model(s) of the plurality of trained ML models, one or more second features, respectively; and
provide an annotated image by annotating each of the plurality of bounded image regions using the respective first features and annotating each of the plurality of image sub-regions using the respective second features.

* * * * *